(12) United States Patent
Hallgren et al.

(10) Patent No.: US 7,476,266 B2
(45) Date of Patent: Jan. 13, 2009

(54) APPARATUS FOR CLEANING OF GAS

(75) Inventors: Ingvar Hallgren, Tumba (SE); Thomas Eliasson, Alvsjo (SE)

(73) Assignee: Alfa Laval Corporate AB, Lund (SE)

( * ) Notice: Subject to any disclaimer, the term of this patent is extended or adjusted under 35 U.S.C. 154(b) by 554 days.

(21) Appl. No.: 10/524,519

(22) PCT Filed: Aug. 28, 2003

(86) PCT No.: PCT/SE03/01334

§ 371 (c)(1),
(2), (4) Date: Sep. 8, 2005

(87) PCT Pub. No.: WO2004/022239

PCT Pub. Date: Mar. 18, 2004

(65) Prior Publication Data

US 2006/0142135 A1 Jun. 29, 2006

(30) Foreign Application Priority Data

Sep. 4, 2002 (SE) .................................... 0202622

(51) Int. Cl.
*B01D 45/12* (2006.01)

(52) U.S. Cl. .......................................... 55/406; 55/408

(58) Field of Classification Search .................... 55/400, 55/404, 406, 408; 384/468
See application file for complete search history.

(56) References Cited

U.S. PATENT DOCUMENTS 4,210,276 A * 7/1980 Lapshev et al. ............... 494/64
2001/0012814 A1 8/2001 May et al.

FOREIGN PATENT DOCUMENTS

WO WO 01/00969 A1 1/2001
WO WO 01/36103 A1 5/2001

* cited by examiner

*Primary Examiner*—Robert A Hopkins
(74) *Attorney, Agent, or Firm*—Michaud-Duffy Group LLP

(57) ABSTRACT

In an apparatus for cleaning of gases a centrifugal rotor is supported by two bearings, in which it is rotatable about a rotational axis. The two bearings are lubricated by means of an oil mist, which is generated in a space, when oil is sprayed against a turbine wheel supported by the rotor. Whereas the bearing, which is situated nearest said space, is lubricated by oil mist present in the space, the second bearing is lubricated by oil mist being conducted to it through a central channel in the centrifugal rotor.

13 Claims, 1 Drawing Sheet

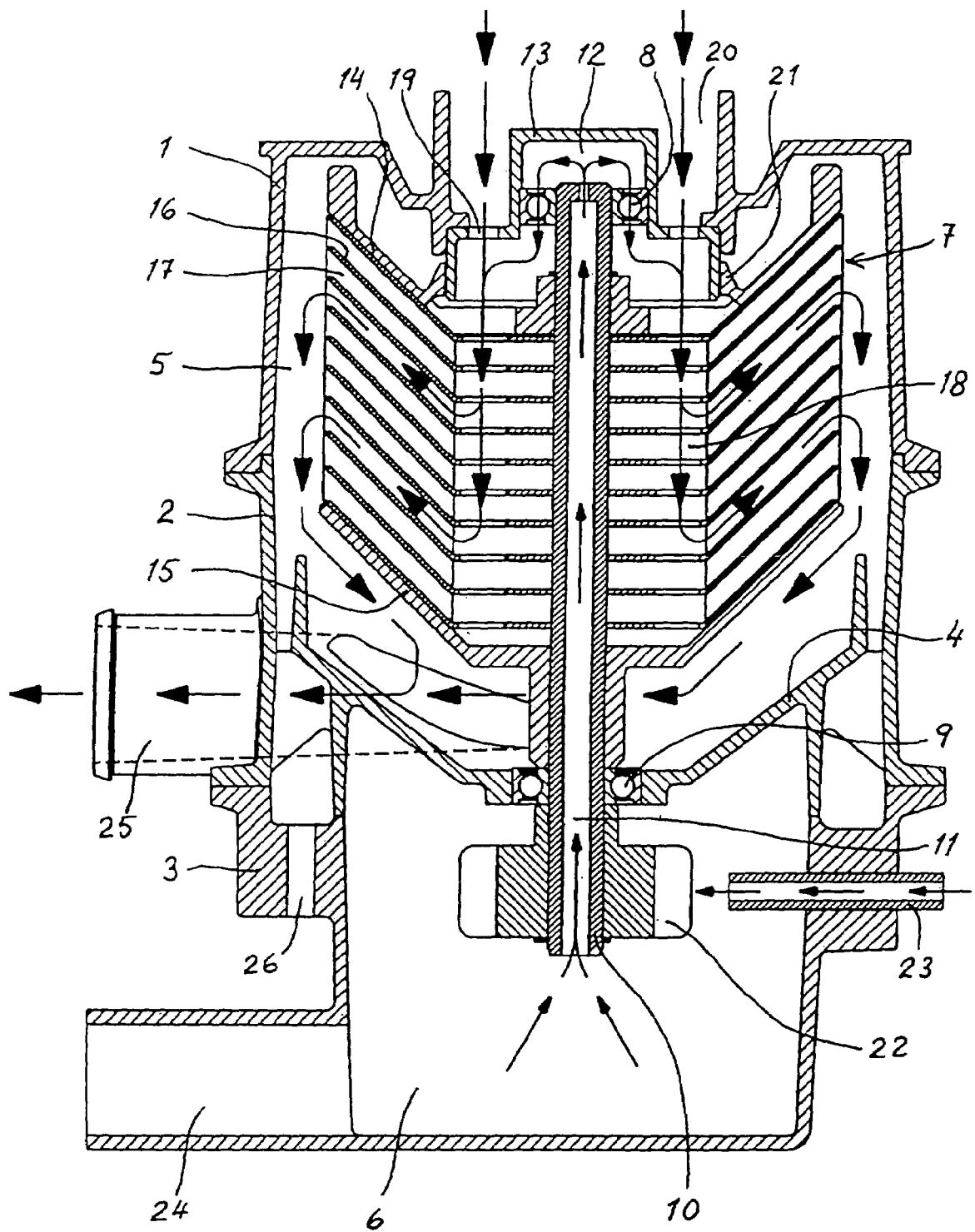

APPARATUS FOR CLEANING OF GAS

CROSS-REFERENCE TO RELATED APPLICATIONS

This application is entitled to the benefit of and incorporates by reference essential subject matter disclosed in International Application No. PCT/SE2003/001334 filed on Aug. 28, 2003 and Swedish Patent Application No. 0202622.7 filed on Sep. 4, 2002.

FIELD OF THE INVENTION

The present invention relates to an apparatus for cleaning gas from particles suspended therein, including a centrifugal rotor for rotation of the gas. The centrifugal rotor is rotatable about a rotational axis in two bearings arranged axially spaced from each other.

BACKGROUND OF THE INVENTION

Self-lubricating bearings are known in the art. Such bearings generally do not require the supply of additional lubricant during operation. However, a difficulty often occurs when these bearings are used in conjunction with a centrifuge rotor. In those cases, it is often required that the bearings be charged continuously or intermittently with lubricant in the form of oil or some other liquid. Sometimes, where the rotor is used to clean gas, liquid suspended in the gas may be used for the lubrication. In other cases, lubricant from a lubricant source may have to be supplied.

The general object of the present invention is to provide a centrifugal gas cleaning apparatus that facilitates adequate lubrication of the bearings support the centrifuge rotor.

SUMMARY OF THE INVENTION

According to the invention, this object may be obtained by an apparatus, in which the centrifugal rotor surrounds a channel, which extends axially—preferably centrally—through the rotor and through which a lubricant mist is movable from a space near the centrifugal rotor into contact with one of at least two bearings rotatably coupled to the centrifugal rotor. Hereby it is made possible for both of the bearings to be easily accessible to lubricant mist from said space without a separate connection having to be created outside the centrifugal rotor between the space and the bearing situated farthest therefrom.

The space may contain or be arranged so that gas to be cleaned in the centrifugal rotor and containing suspended drops of lubricant, e.g. oil of some kind flows through the space. As an example, this may be the case when the apparatus is arranged for cleaning of crankcase gas coming from a combustion engine. In this case, the centrifugal rotor may be arranged to be driven in any suitable way, e.g. by means of an electric motor or a gas turbine. Alternatively, said space may contain a lubricant mist, which is generated especially to provide lubrication of the bearings of the centrifugal rotor. In another case, a lubricant mist may be generated in connection with bringing the centrifugal rotor into rotation hydraulically. For instance, the centrifugal rotor may be brought into rotation by being charged with pressurized oil, which leaves the centrifugal rotor through a nozzle placed at a distance from the rotational axis of the centrifugal rotor and directed tangentially relative thereto. In the chamber, in which such driving oil leaves the centrifugal rotor, an oil mist is created in the surrounding gas or air. Alternatively, hydraulic driving of the centrifugal rotor may be performed such that a pressurized oil is sprayed against a turbine wheel arranged for rotation of the centrifugal rotor. The space surrounding the turbine wheel will then be filled with an oil mist.

In a preferred embodiment of the present invention, one axial end of the centrifugal rotor is situated within or near the space containing lubricating oil mist, the channel through the centrifugal rotor extending from said one axial end of the centrifugal rotor to the opposite end thereof, where it opens into a lubricant chamber having an outlet arranged so that lubricant mist, which moves through the lubricant chamber, gets into contact with said one of the bearings.

BRIEF DESCRIPTION OF THE DRAWING

The invention is further described in the following with reference to the accompanying drawing, which shows an apparatus according to the invention for cleaning of crankcase gas, produced in a combustion engine, from oil and other particles dispersed in the crankcase gas.

DETAILED DESCRIPTION OF THE PREFERRED EMBODIMENT

In the drawing there is shown a housing, which includes an upper part 1, an intermediate part 2 and a lower part 3. The interior of the housing is divided by means of a partition 4 into an upper separation chamber 5 and a lower driving chamber 6. A centrifugal rotor 7 is rotatable in the separation chamber 5 around a vertical rotational axis and is therefore journalled in an upper bearing 8 and a lower bearing 9. The bearings 8 and 9, which are ball bearings in the illustrated embodiment, are supported by the upper housing part I and the partition 4, respectively.

The centrifugal rotor 7 has a central shaft 10, which is suspended in the two bearings 8 and 9 and has an axial through channel 11. The channel 11 communicates at its lower end with the driving chamber 6 and at its upper end with a small chamber 12, which is delimited by a bowl-shaped cap 13 arranged upside-down. The cap 13 supports on its inside the upper bearing 8 and is itself supported by the upper housing part 1.

The centrifugal rotor further has an upper conical end wall 14 and a lower conical end wall 15. Between these end walls there is arranged a stack of conical separation discs 16, which between themselves delimit separation passages 17. Spacing members (not shown) keep the separation discs at an axial distance from each other. The upper end wall 14 as well as each of the separation discs 16 has a central plane portion that is provided with several through holes distributed around the central shaft 10. The inter-spaces between the central portions of the separation discs form together with the through holes a central inlet chamber 18 in the centrifugal rotor.

At its upper end the inlet chamber 18 communicates with an inlet 20, via through holes 19 in the cap 13, for gas to be cleaned in the centrifugal rotor. The gas inlet 20 is formed by the upper housing part 1. The inlet chamber 18 also communicates with the chamber 12 in the cap 13 via the interspaces between the balls in the ball bearing 8.

A radially inner edge portion 21 of the upper end wall 14 of the centrifugal rotor is placed very close to a sleeve-formed portion of the stationary cap 13. If desired, a sliding seal or a labyrinth seal may be arranged between the end wall 14 and the cap 13.

On its lower end portion, which is situated in the driving chamber 6, the central shaft 10 supports a turbine wheel 22. A tube 23 connected to a source of pressurized oil (not shown)

extends from the outside and in through a surrounding wall of the lower housing part 3. Preferably, the tube 23 is connected to the initially mentioned combustion engine for receiving lubricating oil present therein at a high pressure. The tube 23 is directed towards the turbine wheel 22, so that incoming lubricating oil under pressure may bring the turbine wheel and, thereby, the centrifugal rotor 7 into rotation. The lower housing part 3 has a bottom outlet 24 for used lubricating oil, which is to be returned to the combustion engine.

Upon rotation of the turbine wheel an oil mist is formed in the driving chamber 6, which is used for lubrication of the two bearings 8 and 9 as will be described later.

The separation chamber 5 has an outlet 25 for crankcase gas, freed from oil drops and other particles, and an outlet 26 for oil and particles, which have been separated from the crankcase gas.

The cleaning apparatus shown in the drawing operates as follows.

Lubricating oil from a combustion engine is introduced at an over pressure through the tube 23, so that the turbine wheel 22 and therewith the centrifugal rotor 7 are brought into rotation. Crankcase gas from the combustion engine enters through the inlet 20 in the upper housing part 1 and flows through the holes 19 in the cap 13 into the central inlet chamber 18 in the centrifugal rotor 7. From the inlet chamber 18 the crankcase gas flows further through the separation passages 17 and exits to the part of the separation chamber 5, which is situated between the centrifugal rotor and the surrounding walls of the housing parts I and 2. Hence cleaned crankcase gas flows out through the outlet 25.

By the rotation of the centrifugal rotor also the crankcase gas in the separation passages 17 is brought in rotation, the particles, solid and liquid, suspended in the crankcase gas being separated by the resulting centrifugal force and depositing on the conical surfaces of the separation discs 16, facing upwardly. The particles slide and/or flow on these surfaces to the radially outer edges of the separation discs and are thrown out therefrom towards the surrounding walls of the housing parts I and 2. On these surrounding walls the particles slide and/or flow further downwardly towards and out through the outlet 26 in the lower housing part 3.

In the driving chamber 6 an oil mist is formed, when the lubricating oil from the pipe 23 hits and leaves the turbine wheel 22. Whereas the main part of the lubricating oil leaves the driving chamber through the bottom outlet 24, a part of the oil mist flows up through the channel 11 in the shaft 10 to the chamber 12 delimited by the cap 13. Therefrom, the oil mist flows through the bearing 8 further into the central inlet chamber 18 of the centrifugal rotor, mixing itself therein with incoming crankcase gas. Together with the crankcase gas the oil mist flows through the separation passages 17, wherein the oil drops are separated from the gaseous part of the oil mist.

As a consequence of the crankcase gas and the oil mist being entrained in the rotation of the centrifugal rotor upon the through flow of the separation passages 17, a certain underpressure is developed in the central inlet chamber 18 of the centrifugal rotor. The result of this is that crankcase gas is sucked into the inlet chamber 18 from the inlet 20 and that oil mist is sucked from the driving chamber 6 through the channel 11 and the chamber 12 into the inlet chamber 18. Hereby, an effective lubrication of the upper bearing 8 is obtained. The lower bearing 9 is also effectively lubricated, as it is in direct contact with the oil mist in the driving chamber 6 all the time.

As can be seen from the drawing, the channel 11 has a throttle at its uppermost part, i.e. the opening of the channel into the chamber 12 has a smaller diameter than the rest of the channel. This may be necessary, partly for limiting somewhat the flow of oil mist to the bearing 8, partly for avoiding that oil foam, possibly formed in the driving chamber 6 and accompanying the oil mist up through the channel 11, reaches the chamber 12. Such foam will be separated to oil and gas in the channel 11 as a consequence of being entrained in the rotation of the shaft 10. By said throttle, forming a threshold at the opening of the channel 11 into the chamber 12, oil having been separated in the channel 11 is forced to flow back to the driving chamber 6.

Above is described a centrifugal rotor having a hollow shaft 10 which is suspended in bearings arranged on the outside of the shaft. The invention also encompasses a centrifugal rotor that is suspended in bearings, which are supported on the outside of a stationary shaft extending centrally through the centrifugal rotor. In such a case, the stationary shaft may have a through channel for oil mist that shall move from one to the other of the axial ends of the centrifugal rotor. Also in this case, thus, the centrifugal rotor surrounds the channel for oil mist.

The invention claimed is:

1. An apparatus for cleaning of a gas from particles suspended therein comprising:
    a centrifugal rotor for rotation of the gas, which centrifugal rotor is rotatable about a rotational axis in two bearings arranged axially spaced from each other and arranged to be charged with lubricant during operation of the centrifugal rotor,
    the centrifugal rotor surrounds a channel, which extends axially through the rotor and through which a mist of said lubricant is movable from a space near the centrifugal rotor into contact with one of said bearings; and
    wherein the centrifugal rotor has a rotatable central shaft, which is rotatable with the rotor.

2. An apparatus according to claim 1, wherein said channel extends centrally through the centrifugal rotor.

3. An apparatus according to claim 1, wherein the rotatable central shaft delimits said channel.

4. An apparatus according to any claim 1, wherein the centrifugal rotor is rotatable by means of pressurized lubricant in a way such that said lubricant mist is generated in said space.

5. An apparatus according to claim 4, wherein the centrifugal rotor is drivingly connected to a turbine wheel, which is situated in said space.

6. An apparatus according to claim 4, wherein the centrifugal rotor supports a turbine wheel, which is situated in said space.

7. An apparatus according to claim 1, wherein the centrifugal rotor has a first axial end, situated in one of within and near said space, the channel through the centrifugal rotor extending from said first axial end of the centrifugal rotor to a second axial end of the centrifugal rotor, where it opens into a lubricant chamber having an outlet arranged such that lubricant mist, which moves through the lubricant chamber, contacts said one bearing.

8. An apparatus according to claim 7, wherein said one bearing is a ball bearing and is arranged in the outlet of the lubricant chamber.

9. An apparatus according to claim 7, wherein the centrifugal rotor is supported by a stationary cap, which delimits said lubricant chamber and supports one of said bearings.

10. An apparatus according to claim 7, wherein the centrifugal rotor has an inlet for gas to be cleaned, situated at said second axial end of the centrifugal rotor.

11. An apparatus according to claim 7, wherein the centrifugal rotor delimits a central inlet chamber for gas to be cleaned, the outlet from said lubricant chamber communicating with the central inlet chamber.

12. An apparatus according to claim 1, wherein the centrifugal rotor includes a stack of conical separation discs, arranged coaxially with said rotational axis and which define separation passages between successive discs, said separation passages for receiving flowing gas to be cleaned, therethrough.

13. An apparatus according to claim 1, wherein the centrifugal rotor is supported in a housing by means of two bearings, the interior of the housing being divided by means of a partition into a separation chamber, wherein the main part of the centrifugal rotor is arranged, and said space, in which a lubricating oil mist is present during operation of the centrifugal rotor, and said partition supporting one of said two bearings so that it is kept in contact with the lubricating oil mist in said space without the lubricating oil mist having to pass through said channel through the centrifugal rotor.

* * * * *